US008578497B2

(12) United States Patent
Antonakakis et al.

(10) Patent No.: US 8,578,497 B2
(45) Date of Patent: Nov. 5, 2013

(54) METHOD AND SYSTEM FOR DETECTING MALWARE

(75) Inventors: Emmanouil Antonakakis, Dunwoody, GA (US); Roberto Perdisci, Smyrna, GA (US); Wenke Lee, Atlanta, GA (US); Gunter Ollmann, Norcross, GA (US)

(73) Assignee: Damballa, Inc., Atlanta, GA (US)

( * ) Notice: Subject to any disclaimer, the term of this patent is extended or adjusted under 35 U.S.C. 154(b) by 89 days.

(21) Appl. No.: 12/985,140

(22) Filed: Jan. 5, 2011

(65) Prior Publication Data

US 2011/0167495 A1 Jul. 7, 2011

Related U.S. Application Data

(60) Provisional application No. 61/292,592, filed on Jan. 6, 2010, provisional application No. 61/295,060, filed on Jan. 14, 2010.

(51) Int. Cl.
*G06F 11/00* (2006.01)
*G06F 15/173* (2006.01)
*H04L 29/06* (2006.01)

(52) U.S. Cl.
CPC .......... *H04L 63/145* (2013.01); *H04L 63/1408* (2013.01); *H04L 29/06* (2013.01)
USPC ................. 726/24; 726/22; 726/23; 709/224; 709/225

(58) Field of Classification Search
USPC ............................ 726/22–24, 3; 709/224–225
See application file for complete search history.

(56) References Cited

U.S. PATENT DOCUMENTS

| 4,843,540 A | 6/1989 | Stolfo |
| 4,860,201 A | 8/1989 | Stolfo et al. |
| 5,363,473 A | 11/1994 | Stolfo et al. |
| 5,497,486 A | 3/1996 | Stolfo et al. |
| 5,563,783 A | 10/1996 | Stolfo et al. |
| 5,668,897 A | 9/1997 | Stolfo |
| 5,717,915 A | 2/1998 | Stolfo et al. |
| 5,748,780 A | 5/1998 | Stolfo |

(Continued)

FOREIGN PATENT DOCUMENTS

| WO | WO 02/37730 | 5/2002 |
| WO | WO 02/098100 | 12/2002 |
| WO | WO 2007050244 | * 5/2007 |

OTHER PUBLICATIONS

Zhaosheng Zhu, Vinod Yegneswaran, Yan Chen, 'Using Failure Information Analysis to Detect Enterprise Zombies', Lecture note of the Institute for Computer Science, Social-Informatics and Telecommuications Engineering, vol. 19, part 4, pp. 185-206, 2009.*

(Continued)

*Primary Examiner* — Catherine Thiaw
(74) *Attorney, Agent, or Firm* — DLA Piper LLP US

(57) ABSTRACT

A system and method of analysis. NX domain names are collected from an asset in a real network. The NX domain names are domain names that are not registered. The real network NX domain names are utilized to create testing vectors. The testing vectors are classified as benign vectors or malicious vectors based on training vectors. The asset is then classified as infected if the NX testing vector created from the real network NX domain names is classified as a malicious vector.

18 Claims, 10 Drawing Sheets

(56) References Cited

U.S. PATENT DOCUMENTS

| | | | |
|---|---|---|---|
| 5,920,848 A | 7/1999 | Schutzer et al. | |
| 6,401,118 B1 | 6/2002 | Thomas | |
| 6,983,320 B1 | 1/2006 | Thomas et al. | |
| 7,013,323 B1 | 3/2006 | Thomas et al. | |
| 7,039,721 B1 | 5/2006 | Wu et al. | |
| 7,069,249 B2 | 6/2006 | Stolfo et al. | |
| 7,093,292 B1 | 8/2006 | Pantuso | |
| 7,136,932 B1 | 11/2006 | Schneider | |
| 7,152,242 B2 | 12/2006 | Douglas | |
| 7,162,741 B2 | 1/2007 | Eskin et al. | |
| 7,225,343 B1 | 5/2007 | Honig et al. | |
| 7,277,961 B1 | 10/2007 | Smith et al. | |
| 7,331,060 B1 | 2/2008 | Ricciulli | |
| 7,372,809 B2 | 5/2008 | Chen et al. | |
| 7,383,577 B2 | 6/2008 | Hrastar et al. | |
| 7,424,619 B1 | 9/2008 | Fan et al. | |
| 7,426,576 B1* | 9/2008 | Banga et al. | 709/245 |
| 7,448,084 B1 | 11/2008 | Apap et al. | |
| 7,483,947 B2* | 1/2009 | Starbuck et al. | 709/206 |
| 7,487,544 B2 | 2/2009 | Schultz et al. | |
| 7,536,360 B2 | 5/2009 | Stolfo et al. | |
| 7,634,808 B1* | 12/2009 | Szor et al. | 726/22 |
| 7,639,714 B2 | 12/2009 | Stolfo et al. | |
| 7,657,935 B2 | 2/2010 | Stolfo et al. | |
| 7,665,131 B2* | 2/2010 | Goodman et al. | 726/13 |
| 7,698,442 B1 | 4/2010 | Krishnamurthy | |
| 7,752,125 B1 | 7/2010 | Kothari et al. | |
| 7,752,665 B1 | 7/2010 | Robertson et al. | |
| 7,779,463 B2 | 8/2010 | Stolfo et al. | |
| 7,784,097 B1 | 8/2010 | Stolfo et al. | |
| 7,818,797 B1 | 10/2010 | Fan et al. | |
| 7,913,306 B2 | 3/2011 | Apap et al. | |
| 7,930,353 B2* | 4/2011 | Chickering et al. | 709/206 |
| 7,962,798 B2 | 6/2011 | Locasto et al. | |
| 7,979,907 B2 | 7/2011 | Schultz et al. | |
| 7,996,288 B1 | 8/2011 | Stolfo | |
| 8,015,414 B2* | 9/2011 | Mahone et al. | 713/189 |
| 8,019,764 B1 | 9/2011 | Nucci | |
| 8,074,115 B2 | 12/2011 | Stolfo et al. | |
| 8,161,130 B2* | 4/2012 | Stokes et al. | 709/217 |
| 8,224,994 B1* | 7/2012 | Schneider | 709/245 |
| 8,341,745 B1 | 12/2012 | Chau | |
| 8,347,394 B1 | 1/2013 | Lee | |
| 2001/0044785 A1 | 11/2001 | Stolfo et al. | |
| 2001/0052007 A1 | 12/2001 | Shigezumi | |
| 2001/0052016 A1 | 12/2001 | Skene et al. | |
| 2001/0055299 A1 | 12/2001 | Kelly | |
| 2002/0021703 A1 | 2/2002 | Tsuchiya et al. | |
| 2002/0066034 A1 | 5/2002 | Schlossberg et al. | |
| 2003/0065926 A1 | 4/2003 | Schultz et al. | |
| 2003/0065943 A1 | 4/2003 | Geis et al. | |
| 2003/0069992 A1 | 4/2003 | Ramig | |
| 2003/0167402 A1 | 9/2003 | Stolfo et al. | |
| 2003/0204621 A1 | 10/2003 | Poletto et al. | |
| 2004/0002903 A1 | 1/2004 | Stolfo et al. | |
| 2004/0111636 A1 | 6/2004 | Baffes et al. | |
| 2004/0187032 A1 | 9/2004 | Gels et al. | |
| 2004/0205474 A1 | 10/2004 | Eskin et al. | |
| 2004/0215972 A1 | 10/2004 | Sung et al. | |
| 2005/0021848 A1 | 1/2005 | Jorgenson | |
| 2005/0039019 A1 | 2/2005 | Delany | |
| 2005/0108407 A1 | 5/2005 | Johnson et al. | |
| 2005/0108415 A1 | 5/2005 | Turk et al. | |
| 2005/0257264 A1 | 11/2005 | Stolfo et al. | |
| 2005/0261943 A1 | 11/2005 | Quarterman et al. | |
| 2005/0265331 A1 | 12/2005 | Stolfo | |
| 2005/0281291 A1 | 12/2005 | Stolfo et al. | |
| 2006/0015630 A1 | 1/2006 | Stolfo et al. | |
| 2006/0075084 A1 | 4/2006 | Lyon | |
| 2006/0143711 A1 | 6/2006 | Huang et al. | |
| 2006/0146816 A1 | 7/2006 | Jain | |
| 2006/0156402 A1 | 7/2006 | Stone et al. | |
| 2006/0168024 A1 | 7/2006 | Mehr | |
| 2006/0178994 A1 | 8/2006 | Stolfo et al. | |
| 2006/0212925 A1 | 9/2006 | Shull | |
| 2006/0224677 A1 | 10/2006 | Ishikawa et al. | |
| 2006/0230039 A1 | 10/2006 | Shull | |
| 2006/0247982 A1 | 11/2006 | Stolfo et al. | |
| 2006/0253584 A1 | 11/2006 | Dixon | |
| 2007/0050708 A1 | 3/2007 | Gupta et al. | |
| 2007/0064617 A1* | 3/2007 | Reves | 370/252 |
| 2007/0083931 A1* | 4/2007 | Spiegel et al. | 726/24 |
| 2007/0162587 A1 | 7/2007 | Lund et al. | |
| 2007/0239999 A1 | 10/2007 | Honig et al. | |
| 2007/0274312 A1 | 11/2007 | Salmela et al. | |
| 2007/0294419 A1 | 12/2007 | Ulevitch | |
| 2008/0028073 A1 | 1/2008 | Trabe et al. | |
| 2008/0028463 A1* | 1/2008 | Dagon et al. | 726/22 |
| 2008/0060054 A1 | 3/2008 | Srivastava | |
| 2008/0098476 A1 | 4/2008 | Syversen | |
| 2008/0133300 A1 | 6/2008 | Jalinous | |
| 2008/0155694 A1 | 6/2008 | Kwon et al. | |
| 2008/0177736 A1 | 7/2008 | Spangler | |
| 2008/0184371 A1 | 7/2008 | Moskovitch | |
| 2008/0229415 A1* | 9/2008 | Kapoor et al. | 726/22 |
| 2008/0262985 A1 | 10/2008 | Cretu et al. | |
| 2008/0263659 A1* | 10/2008 | Alme | 726/22 |
| 2008/0276111 A1 | 11/2008 | Jacoby et al. | |
| 2009/0055929 A1* | 2/2009 | Lee et al. | 726/23 |
| 2009/0083855 A1 | 3/2009 | Apap et al. | |
| 2009/0193293 A1 | 7/2009 | Stolfo et al. | |
| 2009/0210417 A1 | 8/2009 | Bennett | |
| 2009/0222922 A1 | 9/2009 | Sidiroglou et al. | |
| 2009/0241191 A1 | 9/2009 | Keromytis et al. | |
| 2009/0254658 A1* | 10/2009 | Kamikura et al. | 709/225 |
| 2009/0254992 A1 | 10/2009 | Schultz et al. | |
| 2009/0282479 A1 | 11/2009 | Smith et al. | |
| 2009/0327487 A1 | 12/2009 | Olson et al. | |
| 2010/0011243 A1 | 1/2010 | Locasto et al. | |
| 2010/0023810 A1 | 1/2010 | Stolfo et al. | |
| 2010/0031358 A1 | 2/2010 | Elovici et al. | |
| 2010/0054278 A1 | 3/2010 | Stolfo et al. | |
| 2010/0064368 A1 | 3/2010 | Stolfo et al. | |
| 2010/0064369 A1 | 3/2010 | Stolfo et al. | |
| 2010/0077483 A1 | 3/2010 | Stolfo et al. | |
| 2010/0138919 A1* | 6/2010 | Peng et al. | 726/22 |
| 2010/0146615 A1 | 6/2010 | Locasto et al. | |
| 2010/0153785 A1 | 6/2010 | Keromytis et al. | |
| 2010/0169970 A1 | 7/2010 | Stolfo et al. | |
| 2010/0269175 A1 | 10/2010 | Stolfo et al. | |
| 2010/0274970 A1 | 10/2010 | Treuhaft et al. | |
| 2010/0275263 A1 | 10/2010 | Bennett et al. | |
| 2010/0281541 A1 | 11/2010 | Stolfo et al. | |
| 2010/0281542 A1 | 11/2010 | Stolfo et al. | |
| 2010/0332680 A1* | 12/2010 | Anderson et al. | 709/245 |
| 2011/0041179 A1* | 2/2011 | St Hlberg | 726/23 |
| 2011/0167493 A1 | 7/2011 | Song et al. | |
| 2011/0167494 A1 | 7/2011 | Bowen et al. | |
| 2011/0185428 A1 | 7/2011 | Sallam | |
| 2011/0214161 A1 | 9/2011 | Stolfo et al. | |

OTHER PUBLICATIONS

Cliff Changchun Zou et al., "Code Red Worm Propagation Modeling and Analysis", in Proceedings of 9th ACM Conference on Computer and Communications Security (CCS '02), Nov. 18, 2002.

Cliff C. Zou et al,. "Email Worm Modeling and Defense", In the 13th ACM International Confrerence on Computer Communications and Networks (CCCN '04), Oct. 27, 2004.

Cliff Changchun Zou et al., "Monitoring and Early Warning for Internet Worms", In Proceedings fo the 10th ACM Conference on Computer and Communications Security (CCS '03), Oct. 2003.

Cliff Changchun Zou et al., "On the Performance of Internet Worm Scanning Strategies", Technical Report TR-03-CSE-07, Umass ECE Dept., Nov. 2003.

Alexander Gostev, "Malware Elovution: Jan.-Mar. 2005", Viruslist.com, http.//www.viruslist.com/en/analysis?pubid=162454316, (Apr. 18, 2005).

Jiang Wu et al., "An Effective Architecture and Algorithm for Detecting Worms with Various Scan Techniques", In Proceedings of the 11th Annual Network and Distributed System Security Symposium (NDSS '04), Feb. 2004.

(56) References Cited

OTHER PUBLICATIONS

Matthew M. Williamson et al., "Virus Throttling for Instant Messaaing", Virus Bulletin Conference, Sep. 2004, Chicago, IL, USA, (Sep. 2004).
F. Weimer, "Passive DNS Replication", http://www.enyo.de/fw/software/dnslogger, 2005.
Ke Wang et al., "Anomalous Payload-Based Network Intrusion Detection", In Proceedings of the 7th International Symposium on Recent Advances in Intrusion Detection (RAID 2004), 2004.
P. Vixie et al,. "RFC 2136; Dynamic Updates in the Domain Name System (DNS Update)", http://www.faqs.org/rfcs.rfc2136.html (Apr. 1997).
Joe Stewart, "Dipnet/Oddbob Worm Analysis", SecureWorks, http://www.secureworks.com/research/threats/dipnet/ (Jan. 13, 2005).
Harold Thimbleby et al., "A Framework for Modeling Trojans and Computer Virus infection", Computer Journal vol. 41, No. 7, pp. 444-458 (1999).
Paul Bachner et al., "Know Your Enemy: Tracking Botnets", http://www.honeynet.org/papers/bots/, (Mar. 13, 2005).
"LockDown Security Bulletin -Sep. 23, 2001", http://lockdowncorp.com/bots/ (Sep. 23, 2001).
Colleen Shannon et al., "The Spread of the Witty Worm", http://www.caida.org/analysis/security/witty/index.xml (Mar. 19, 2004).
Moheeb Abu Rajab et al., "On the Effectiveness of Distributed Worm Monitoring", In Proceedings fo the 14th USENIX Security Symposium (2005).
Niels Provos, "CITI Technical Report 03-1: A Virtual Honeypot Framework", http://wwvv.citi.umich.edu/techreports/reports/citi-tr-03-1.pdf (Oct. 21, 2003).
"Know your Enemy: Honeynets", http://www.honeypot.org/papers/honeynet, (May 31, 2006).
David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004.
David Moore et al., "Slammer Worm Dissection: Inside the Slammer Worm", IEEE Security & Privacy, vol. 1, No. 4 (Jul-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart, "Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA, May 20-22, 1991; pp. 343-359 (May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
"NSTX (IP-over-DNS) HOWTO", http://thomer.com/howtos/nstx.html (Nov. 4, 2005).
V. Fuller et al., "RFC 1519—Classless Inter-Domain Routing (CIDR): An Address Assignment and Aggregation Strategy", http://www.faqs.org/rfcs/rfc1519.html (Sep. 1993).

David E. Smith "Dynamic DNS", http://www.technopagan.org/dynarnic (Aug. 7, 2006).
Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kepil Kumar Singh, "IRC Reconnaissance (IRCRecon) Public IRC Heuristics (BotSniffer)" (Jul. 24, 2006).
http://www.trendmicro.com/en/home/us/home.htm
"InterCloud Security Service", http://ww.trendmicro.com/en/products/nss/icss/evaluate/overview.thm.
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506,htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy pp. 370-375.
Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al. "Real-Time and Forensic Network Data Analysis Using Animated and Coordinated Visualization", Proceedings of the 6th IEEE Information Assurance Workshop (Jun. 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf. (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access for Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.02.pdf.
Yin Zhang et al., "Detecting Stepping Stones", Proceedings of the 9th USENIX Security Symposium, Denver, Colorado, USA, Aug. 14-17, 2000.

(56) References Cited

OTHER PUBLICATIONS

Joe Stewart, "Bobax Trojan Analysis", http://www.lurhq.com/bobax. html May 17, 2004.
David Brumley et al., "Tracking Hackers on IRC", http://www.doomded.com/texts/ircmirc/TrackingHackersonIRC.htm, Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.
DMOZ Open Directory Project, Dynamic DNS Providers List, http://dmoz.org/Computers/Software/Internet/Servers/Address_Management/Dynamic_DNS_Services/.
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3iI) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones at al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Stragetic Use of LaBrea", http://www.hackbusters.net/LaBrea/LaBrea.txt, Oct. 24, 2001.
R. Pointer, "Eggdrop Development", http://www.eggheads.org, Oct. 1, 2005.
S. Staniford, "Code Red Analysis Pages: July Infestation Analysis", http://silicondefense.org/cr/july.html, Nov. 18, 2001.
Alex Ma, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 1, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 mailed Jul. 8, 2008.
Written Opinion issued in Application No. PCT/US06/038611 mailed Jul. 8, 2008.
International Preliminary Report on Patentability issued in Application No. PCT/US06/038611 mailed Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1-Jun. 30, 2004" Symantec, Sep. 2004, pp. 1-54.
David Dagon et al, "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the Domino Overlay System", Proceedings of Network and Distributed Security Symposium (NDSS), 17 pages Feb. 2004.
Vinod Yegneswaran et al., "On the Design and Use of Internet Sinks for Network Abuse Monitoring", RAID 2004, LNCS 3224, pp.146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. Zou et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stets", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.
Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Felix C. Freiling et al., "Botnet Tracking: Exploring a Root-Cause Methodology to Prevent Distributed Denial-of-Service Attacks", ESORICS 2005, LNCS 3679, pp. 319-335 (2005).
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Stephan Axelsson, "The Base-Rate Fallacy and the Difficulty of Intrusion Detection", ACM Transactions on Information and System Security, vol. 3, No. 3, pp. 186-205 (Aug. 2000).
Niel Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.

(56) References Cited

OTHER PUBLICATIONS

File History of U.S. Appl. No. 11/535,212, electronically captured on May 18, 2011.
File History of U.S. Appl. No. 12/538,612, electronically captured on May 18, 2011.
File History of U.S. Appl. No. 13/008,257, electronically captured on May 18, 2011.
File History of U.S. Appl. No. 11/538,212, electronically captured on May 30, 2013 for May 18, 2011 to May 30, 2013.
File History of U.S. Appl. No. 12/538,612, electronically captured on May 30, 2013 for May 18, 2011 to May 30, 2013.
File History of U.S. Appl. No. 13/008,257, electronically captured on May 30, 2013 for May 18, 2011 to May 30, 2013.
File Pair History of U.S. Appl. No. 13/205,928, electronically captured on May 30, 2013.
File History of U.S. Appl. No. 13/309,202, electronically captured on May 30, 2013.
File History of U.S. Appl. No. 13/358,303, electronically captured from May 30, 2013.
File History of U.S. Appl. No. 13/749,205, electronically captured on May 30, 2013.
Guofei Gu et al. "BotMiner: Clustering Analysis of Network Traffic Protocol- and Structure-Independent Botnet Detection", 2008, USENIX Security Symposium, pp. 139-154.
Manos Antonakakis et al., "Building a Dynamic Reputation System for DNS", 19th USENIX Security Symposium, Aug. 11-13, 2010 (17 pages).
P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www.ietf.org/rfc/rfc1035.txt, Nov. 1987 (52 pages).
Phillip Porras et al. "SRI International Technical Report: An Analysis of Conficker's Logic and Rendezvous Points", http://mtc.sri.com/Conficker/, Mar. 19, 2009, (31 pages).
Phillip Porras et al. "SRI International Technical Report: Conficker C Analysis", http://mtc.sri.com/Conficker/addendumC, Apr. 4, 2009, (24 pages).
Paul Royal, Damballa, "Analysis of the Kracken Botnet", Apr. 9, 2008 (13 pages).
Sergei Shevchenko, "Srizbi's Domain Calculator", http://blog.threatexpert.com/2008/11/srizbix-domain-calculator.html, Nov. 28, 2008 (3 pages).
Sergei Shevchenko, "Domain Name Generator for Murofet", http://blog.threatexpert.com/2010/10/domain-name-generator-for-murofet.html, Oct. 14, 2010, 2010 (4 pages).
P Akritidis et al., "Efficient Content-Based Detection of Zero-Day Worms", 2005 IEEE International Conference in communications, vol. 2, pp. 837-843, May 2005.
M. Patrick Collins et al., "Hit-List Worm Detection and Bot Identification in Large Networks Using Protocol Graphs", RAID 2007, LNCS 4637, pp. 276-295 (2007).
Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of The 19th Annual Computer Security Application Conference (ACSAC'03), (11 pages) (2003).
Lala A. Adamic et al., "Zipf's Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.

Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.
Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Rounup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative Intrusion Detection Framework", In Proceedings of IEEE Symposium on Security and Privacy 2002, pp. 202-215 (2002).
David Dagon et al., "Modeling Botnet Propagation using Time Zones", The 13th Annual Network and Distributed System Security Symposium 2006, Feb. 2-3, 2006 (18 pages).
Roger Dingledine et al., "Tor: The Second-Generation Onion Router", In Proceedings of the 13th Usenix Security Symposium, pp. 303-320 Aug. 9-13, 2004.
Steven T. Eckman et al., "STATL: An Attack Language for State-Based Intrusion Detection", Journal of Computer Security, vol. 10, pp. 71-103 (2002).
Daniel R. Ellis, et al., "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).
Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms Via Behavioral Footprinting", WORM'06, Nov. 3, 2006 (7 pages).
Giovanni Vigna et al., "NetSTAT: A Network-based Intrusion Detection Approach", In Proceedings of the 14th Annual Computer Security Applciations Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printacticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).
Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis Via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", www.damballa.com/downloads/r_pubs/KrakenWhitepaper.pdf (2008) (3pages).
Robert Perdisci et al., "Behavioral Clustering of HTTP-Based Malware and Signature Generation Using Malicious Network Traces", Usenix Symposium on Networked Systems Design and Implementation (NSDI 2010), (2010) (16 Pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant of Mimicry Attack", In Proceedings of the International Symposium on Recent Advances in Intrusion Detection (RAID) (2006) (20 pages).

(56) References Cited

OTHER PUBLICATIONS

Ke Wang at al., "Anomalous Payload-Based Worm Detection and Signature Generation", In Proceedigns of the Interantional Symposium on Recent Advances in Intrusion Detection (RAID) (2005) (20 pages).
David Whyte, "Exposure Maps: Removing Reliance on Attribution During Scan Detection", 1st Usenix Workshop on Hot Topics in Security, pp. 51-55 (2006).
Jiahai Yang at al., "CARDS: A Distributed System for Detecting Coorinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al., "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/index.php, updated Oct. 13, 2012 (1 page).
Shuang Hao et al., "An Internet-Wide View into DNS Lookup Patterns", http:labs.verisign.com/projects/malicious-domain-names/white-paper/dns-imc2010.pdf (2010) (6 pages).
Thorsten Holz et al., "Measuring and Detecting Fast-Flux Service Networks", In Proceedings of NDSS (2008) (12 pages).
Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Anaylsis of the Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What We Know (and Learn) for the Waledac Takedown", http://blogs.technet.com/b/mmpc/archive/2010/03/15/what-we-know-and-learned-from-the -waledac-takedown.aspx, Mar. 15, 2010 (2 pages).
"Trojan:Java/Boonan", http://microsoft.com/security/portal/threat/encyclopedia/entry.aspx?Name=Trojan%3AJava%2FBoonan, Apr. 17, 2011 (5 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Sandeep Yadav et al., "Detecting Algorithmically Generated Malicious Domain Names", In Proceedings of the 10th Annual Confernece on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More about Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, A Fast and Portable Dynamic Translator", In Proceedings of the Annual Confernce on Usenix Annual Technical Conference, pp. 41-46 (2005).

Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Unstructured Data", Cambridge Univ. Pr., 2007.
Michael Hale Ligh et al., "Malware Analyst's Cookbook and DVD", Wiley, 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley 2005 Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006 .
C. Willems et al., "Toward Automated Dynamic Malware Analysis Using CWSandbox", IEEE Security and Privacy, vol. 5, No. 2, pp. 32-39, 2007.
R Development Core Team, "R: A Language and Environment for statistical Computing", R. Foundation for Statistical Computing, Vienna Austria, 2008.
Juan Caballero et al., "Polyglot: Automatic Extraction of Protocol Message Format Using Dynamic Binary Analysis", In Proceedings of the ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al,. "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/paper/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Applications Conference ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).

(56) References Cited

OTHER PUBLICATIONS

Rich Uhlig et al., "Intel Virualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisbilethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).
Danny Quist, "Covert Debugging Circumventing Software Armoring Techniques"; In Proceedings of Black Hat USA (2007) (5 pages).
Ulrich Bayer et al., "Scalable, Behavior-Based malware Clustering", In Network and Distributed System Security Symposium (2009) (18 pages).
David Brumley at al., "Automatically Identifying Trigger-Based Behavior in Malware", Botnet Detection, pp. 1-24 (2008).
Dancho Danchev, "Web Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2, pp. 50-59 (2007).
Fanglu Guo et al., "A Study of the Packer Problem and Its Solution", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain at al., "Data Clustering: A Review", ACM Computing Surveys, vol. 31, No. 3, pp. 264-323, Sep. 1999.
John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Malware Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In AMC Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communications Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajah et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al, "Enhancing Byte-Level Network Intrusion Detection Signatures with Context", In Proceedings of the 10th ACM Conference on Computer and Communications Security (CCS'03), pp. 262-271, Oct. 27-30, 2003.
"W32/IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al , "GrIDS-A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).

(56) References Cited

OTHER PUBLICATIONS

Roberto Perdisci et al., "Misleading Worm Signature Generators Using Deliberate Noise Injection", In IEEE Symposium on Security and Privacy (2006) (15 pages).
Mark Felegyhazi et al., "On the Potential of Proactive Domain Blacklisting", In the Third Usenix LEET Workshop (2010) (8 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).
Guofei Gu et al. "Bothunter: Detecting Malware Infection Through IDS-Driven Dialog Correlation", Proceedings of 16th USENIX Security Symposium, pp. 167-182 (2007).
The Conficker Working Group, "Conficker Working Group: Lessons Learned", ConfickerWorking_Group_Lessons_Learned_17_June_2010_final.pdf, published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).
R. Arends et al., "Protocol Modifications for the DNS Security Extensions", htp://www.ietf.org/rfc/rfc4035.txt, Mar. 2005 (50 pages).
R. Arends et al., "DNS Security Introduction and Requirements", htp://www.ietf.org/rfc/rfc4033.txt, Mar. 2005 (20 pages).
R. Arends et al., "Resource Records for the DNS Security Extensions", htp://www.ietf.org/rfc/rfc4034.txt, Mar. 2005 (28 pages).
Steiner H. Gunderson, "Global IPv6 Statistics: Measuring the Current State of IPv6 for Ordinary Users", http://meetings.ripe.net/ripe-57/presentations/Colitti-Global_IPv6_statistics_-_Measuring_the_current_state_of_IPv6_for_ordinary_users_.7gzD.pdf, Oct. 24-30, 2008 (20 pages).
Jaeyeon Jung et al., "Modeling TTL-Based Internet Caches", IEEE INFOCOM 2003, pp. 417-426, Mar. 2003.
Srinivas Krishnan et al., "DNS Prefetching and Its Privacy Implications: When Good Things Go Bad", In Proceeding of the 3rd USENIX Conference on Large-Scale Exploits and Emergent Threats: Botnets, Spyware, Worms, and More (LEET'10), (2010) (9 pages).
Zhuoqing Morley Mao et al., "A Precise and Efficient Evaluation of the Proximity Between Web Clients and Their Local DNS Servers", In Proceedings of USENIX Annual Technical Conference (2002) (14 pages).
David Plonka et al., "Context-Aware Clustering of DNS Query Traffic", In Proceedings of the 8th IMC (2008) (13 pages).
Steve Souders, "Sharding Dominant Domains", http://www.stevesouders.com/blog/2009/05/12/sharding-dominant-domains, May 12, 2009 (3 pages).
Paul Vixie, "What DNS Is Not", Communications of the ACM, vol. 52, No. 12, pp. 43-47, Dec. 2009.
Florian Weimer, "Passive DNS Replication", In Proceedings of the 17th Annual FIRST Conference on Computer Security Incident, Apr. 2005 (13 pages).
T. Berners-Lee et al., "RFC3986—Uniform Resource Identifier (URI): Generic Syntax", http://www.hjp.at/doc/rfc/rfc3986.html, Jan. 2005 (62 pages).
Juan Caballero et al., "Measuring Pay-Per-Install: The Commoditization of malware Distribution", In Proceedings of the 20th USENIX Conference on Security (SEC'11), (2011) (16 pages).
Chili-Chung Chang et al., "LIBSVM: A Library for Support Vector Machines" ACM Transactions on Intelligent Systems and Technology 2011, Last Updated Jun. 14, 2007 (26 pages).
D. De La Higuera et al. "Topology of Strings: Median String is NP-Complete", Theoretical Computer Science, vol. 230, pp. 39-48 (2000).
Guofei Gu et ai., "BotSniffer: Detecting Botnet Command and Control Channels in Network Traffic", In Proceedings of the 15th Annual Network and Distributed System Security Symposium (NDSS'08), Feb. 2008 (18 pages).
Grefoire Jacob, "Jackstraws: Picking Command and Control Connections from Bot Traffic", In Proceedings of the 20th USENIX Conference on Security (SEC'11) (2011) (16 pages).
J. Zico Kolter et al., "Learning to Detect and Classify Malicious Executables in the Wild", Journal of Machine Learning Research, vol. 7, pp. 2721-2744, Dec. 2006.
John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.
Team Cymru, "Developing Botnets", http://www.team-cymru.com/ReadingRoom/Whitepapers/2010/developing-botnets.pdf (2010) (3 pages).
Peter Wurzinger et al., "Automatically Generating Models for Botnet Detection", In Proceedings of the 14th European Conference on Research in Computer Security (ESORICS'09), pp. 232-249 (2009).
Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.
Nello Cristianini et al., "An Introduction to Support Vector Machines: and other Kernal-Based Learning Methods", Cambridge University Press, New York, NY, USA (2000).
Timo Sirainen, "IRSSI", http://en.wikipedia.org/wiki/Irssi, updated May 8, 2013 (3 pages).
Team Cymru, "IP to ASN Mapping", http://www.team-cymru.org/Services/ip-to-asn.html, printed Mar. 23, 2013 (6 pages).
http://www.bleedingsnort.com, retrieved from Internet Archive on May 23, 2013, Archived Sep. 26, 2006 (3 pages).
http://www.dshield.org, retrieved from Internet Archive on May 23, 2013, Archived Sep. 29, 2006 (2 pages).
http://www.alexa.com, retrieved from Internet Archive on May 23, 2013, Archived Sep. 25, 2006 (3 pages).
https://sie.isc.org/, retrieved from Internet Archive on May 23, 2013, Archived Dec. 29, 2008 (2 pages).
http://damballa.com, retrieved from Internet Archive on May 23, 2013, Archived Jan. 28, 2007 (10 pages).
http://www.dnswl.org, retrieved from Internet Archive on May 23, 2013, Archived Jul. 15, 2006 (4 pages).
http://www.spamhaus.org/sbl/, retrieved from Internet Archive on May 23, 2013, Archived Sep. 24, 2006 (24 pages).
http://malwaredomains.com, retrieved from Internet Archive on May 23, 2013, Archived Dec. 28, 2007 (12 pages).
http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from the Internet Archive on May 23, 2013, Archived Sep. 29, 2009 (13 pages).
https://alliance.mwcollect.org, retrieved from Internet Archive on May 23, 2013, Archived Jan. 7, 2007 (2 pages).
http://malfease.oarci.net, retrieved from Internet Archive on May 23, 2013, Archived Apr. 12, 2008 (1 page).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
Thomas Ptacek, "Side-Channel Detection Attacks Against Unauthorized Hypervisors", http://www/matasano.com/log/930/side-channel-detection-attaks-against-unauthorized-hypervisors/, Aug. 20, 2007, retrieved from Internet Archive on May 23, 2013, Archived Aug. 27, 2007 (12 pages).
http://cyber-ta.org/release/botHunter/index.html, retrieved from Internet Archive on May 23, 2013, Archive Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archieved Sep. 4, 2006 (12 pages).

(56) References Cited

OTHER PUBLICATIONS http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 (pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications",Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC", http://en,wikipedia.org/wiki/Windows_Virtua_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et at, "KVM: The Linux Virtual Machine Monitor", Proceedings of the Linux Symposium, pp. 225-230, Jun. 27-30, 2007.
Symantec, "Symantec Global Internet Security Tgreat Report: Trends for 2008", vol. XIV, Apr. 2009 (110 pages).
File History of U.S. Appl. No. 11/538,212.
File History of U.S. Appl. No. 13/205,928.
File History of U.S. Appl. No. 13/358,303.

* cited by examiner

215

405

USE META-CLASSIFIER (COMBINATION OF MANY GENERIC CLASSIFIERS)

410

CLASSIFY VECTORS BY: USING SIMPLE INTERNAL ASSETS INFECTED WITH KNOWN MALWARE; SIMPLE INTERNAL ASSETS INFECTED WITH UNKNOWN MALWARE; COMPLEX INTERNAL NETWORKS ASSETS

FIGURE 6

$1^{ST}$: The average of domain name length $2^{nd}$: The standard deviation of the domain name length $3^{rd}$: The number of difference TLDs $4^{th}$: The length of the domain name (excluding the TLD)

$5^{th}$: The median of the number of unique characters $6^{th}$: The average of the number of unique characters $7^{th}$: The standard deviation of the number of unique characters $8^{th}$: The median of unique 2-grams $9^{th}$: The average of unique 2-grams $10^{th}$: The standard deviation of unique 2-grams $11^{th}$: The frequency of .com TLDs over frequency of the rest TLDs $12^{th}$: The median of unique 3-grams $13^{th}$: The average of unique 3-grams $14^{th}$: The standard deviation of unique 3-grams $15^{th}$: The median count of unique TLDs $16^{th}$: The average count of unique TLDs $17^{th}$: The standard deviation count of unique TLDs

FIGURE 7

705 fpemcjfbv.com
odkigktjzv.biz
odkigktjzv.biz.inter1.com
1-sjn-sevans.ca1.intern2.com
xvoal.com
ymtaiwwprpq.biz
ymtaiwwprpq.biz.inter1.com
bcbkdfkg.net
bcbkdfkg.net.inter1.com
okxixsulas.net

| Class | FP | TP |
|---|---|---|
| conficker-B | 0.000539035127122 | 0.855427713857 |
| conficker-C | 0.0 | 0.998998998999 |
| conficker-A | 0.0265001796622 | 0.997997997998 |
| sinowal | 0.0 | 1.0 |
| unknownBot | 0.00257842715943 | 1.0 |
| bobax | 0.00107807025424 | 1.0 |

FIGURE 10

...
www.cb3e557b.com
www.cba4772d.com
www.cc04aff3.com
www.cc9d59d7.com
www.cced67b5.com
www.cd4b4b03.com
www.cd6297c3.com
www.cdb20e03.com
www.cdf4da40.com → Sample from domain names that produce vectors that were
www.ce8c8da1.com      labeled as unknown for the Meta-Classifier. This set of
www.cecd6b2f.com       domain names gave us the initial seed for building the class
www.cee595e8.com       unknonBot.
www.cf1d0a91.com
www.d0188eeb.com
www.d0626118.com
www.d082b59f.com
www.d09a0042.com
...

US 8,578,497 B2

METHOD AND SYSTEM FOR DETECTING MALWARE

CROSS-REFERENCED TO RELATED APPLICATIONS

This application claims benefit of U.S. Provisional Patent Application No. 61/292,592, filed Jan. 6, 2010, and U.S. Provisional Patent Application No. 61/295,060, filed Jan. 14, 2010, the contents of which are incorporated herein by reference in their entireties.

BRIEF DESCRIPTION OF THE FIGURES

FIGS. 6-10 illustrate examples for detecting malware, according to several embodiments.

DESCRIPTION OF EMBODIMENTS OF THE INVENTION

Figure 1:
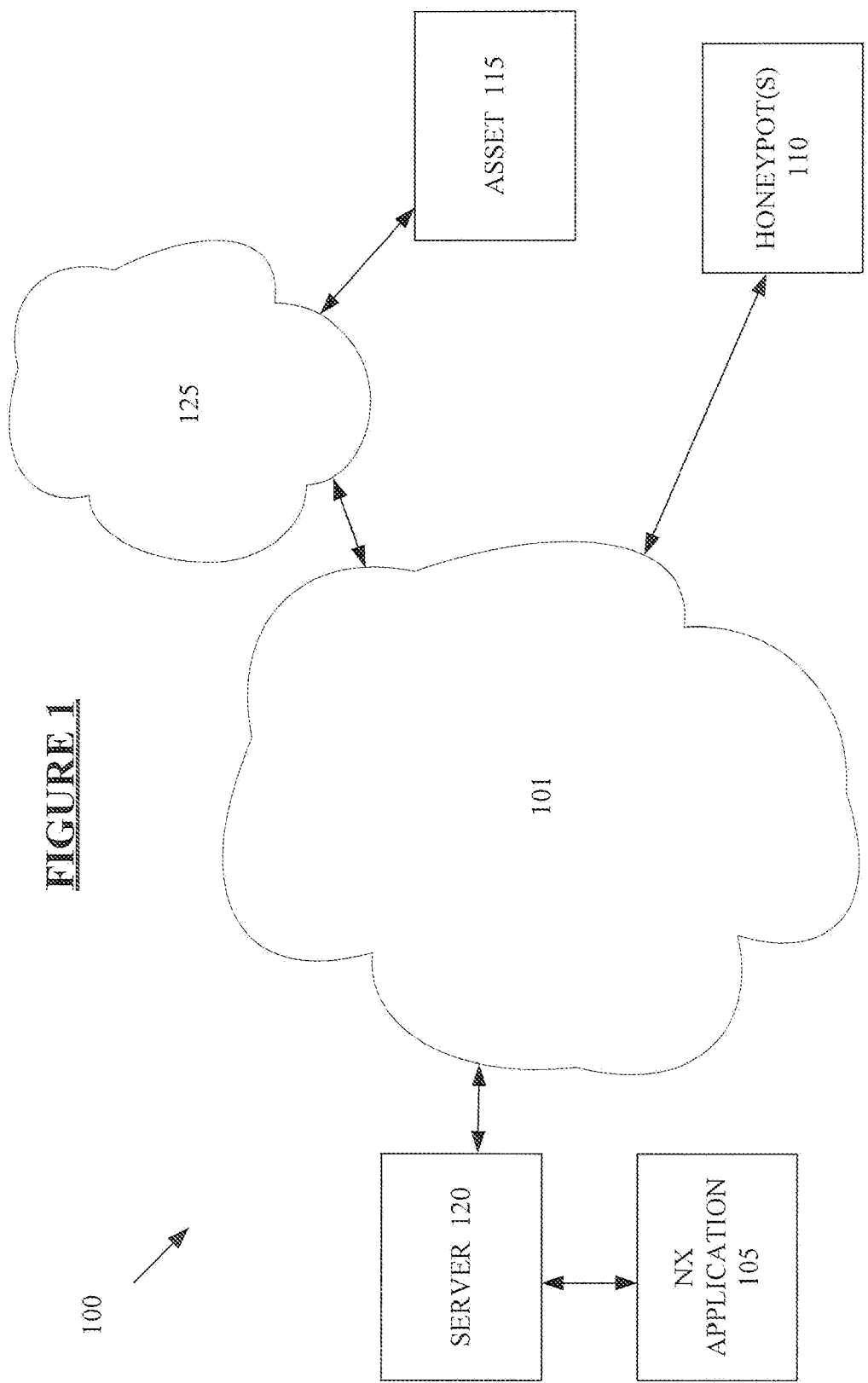
FIG. 1 illustrates a system for detecting malware, according to one embodiment.

FIG. 1 illustrates a system for detecting malware, according to one embodiment. FIG. 1 illustrates at least one network 101 (e.g., the Internet) connecting at least one NX application 105 (described below) on at least one server 120 to at least one honeypot 110 and at least one entity's network 125 (e.g., a private network of a company). The NX application 105 can determine if one or more assets 115 (e.g., computers) on the at least one entity's network 125 is infected with malware. It should be noted that the asset can be a simple asset (e.g., mainframe hardware, storage) or a complex asset (e.g., licensed software).

The determination of whether an asset is infected can comprise: collecting NX domain names from at least one honeypot and at least one asset; using the honeypot NX domain names to create training vectors; using the real network NX domain names to create testing vectors; classifying the testing vectors as benign vectors or malicious vectors; and classifying the at least one asset in the at least one real network as infected if the NX testing vector created from the real network NX domain names is classified as a malicious vector. (It should be noted that the testing vectors can be classified using: simple internal assets infected with known malware; simple internal assets infected with unknown malware; or complex internal network assets; or any combination thereof.)

NX domain name information is useful because some malware takes advantage of existing domain name system (DNS) services such as free domain testing (e.g., determining whether a new domain name is available). Such malware can use a domain name generator that employs a seed, such as the date, together with an algorithm to generate a set of domain names. The command and control (C&C) can try to register the generated domain names until a registrable subset of domain names has been identified. An infected computer can then use those daily-generated set of domain names in order to establish a new communication channel with the C&C. The victim computers will employ the same seed (i.e. date) and algorithm to generate the same set of domain names. The victim computers will then use the generated domain names in attempts to contact the C&C computer. Eventually, each victim computer will find a domain name that was registered for the C&C computer to enable daily communication between the C&C computer and the victim computers. By changing the domain name for the C&C computer (e.g., daily), it becomes difficult to statically black list the domain names or the IP addresses of the C&C computer(s).

Thus, malware which uses the above domain name resolution to establish communication with a C&C can produce many NX-Domains (NXs), which can be domain names that have not been registered with an authoritative DNS and can be observable at a recursive DNS server ("RDNS"). RDNS servers map domain names to IP addresses, also called "resolving DNS queries". If such a mapping between a domain name and an IP address doesn't exist, the RNDS can send back to the initiator of the DNS query a "Non-Existence" response. The Non-Existence response can indicate that the domain name does not have an IP address, and is thus an NX-Domain (NX). Monitoring the NXs observable at a RDNS can provide the ability to collect all possible NXs generated from all computers connected to the RDNS.

Figure 2:
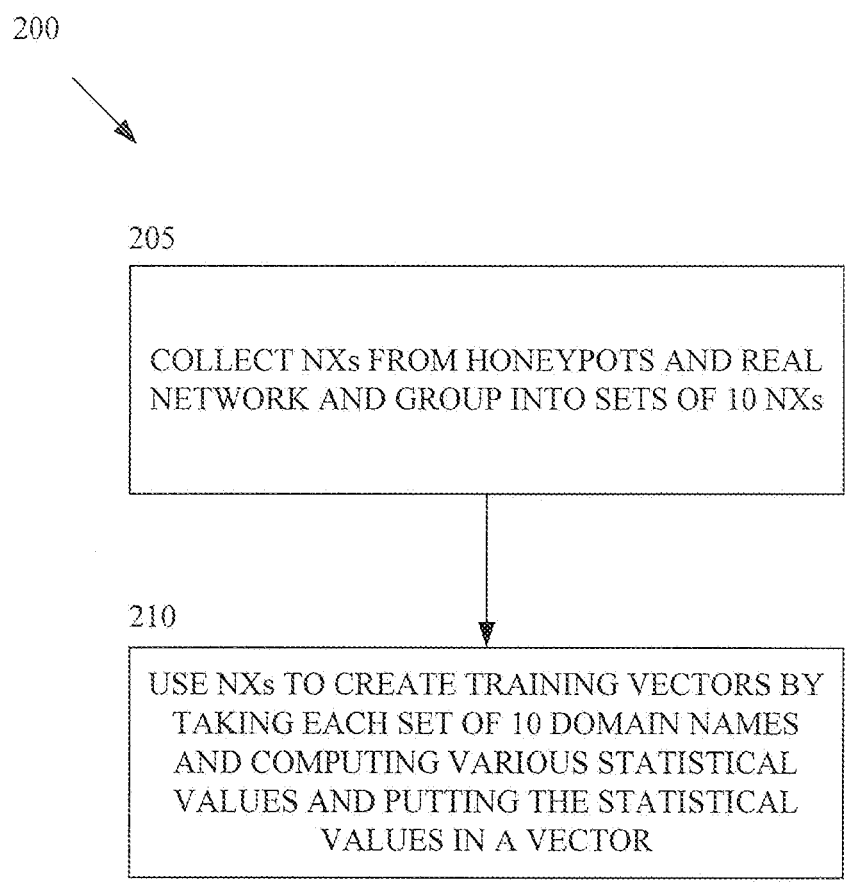
FIGS. 2-4 illustrate a method for detecting malware, according to one embodiment.

FIG. 2 illustrates a method for creating training vectors, according to one embodiment. Referring to FIG. 2, in 205, malware NXs can be collected from at least one honeypot (e.g., an Internet-attached server that acts as a decoy, luring in potential hackers in order to study their activities and monitor how they are able to break into a system) by an NX application 105 and grouped into sets of, for example, 10.

Figure 5:
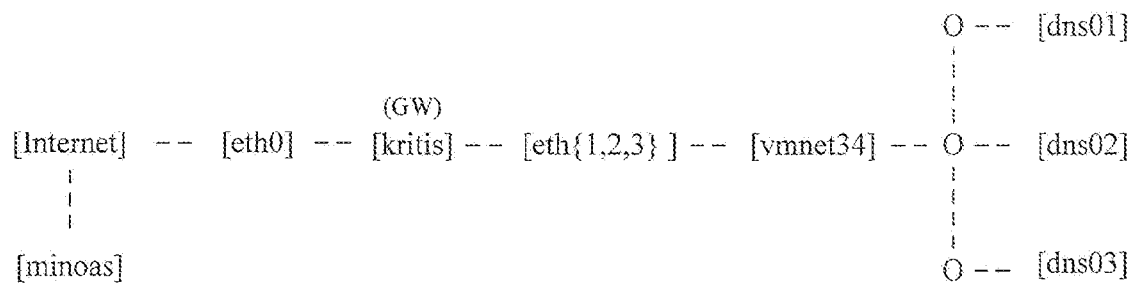
FIG. 5 illustrates various elements involved in domain name resolution.

The malware NXs can be collected so that a classifier can be trained in a controlled environment to recognize different categories of infected computers. For example, FIG. 5 illustrates a honeypot network configuration. In this example, the virtual machine names "kritis" operates as an internal virtual gateway for the virtual machines dns01, dns02 and dns03, which are infected with malware (e.g., sinowal worm, bobax worm). By monitoring the DNS traffic that originates from infected virtual machines dns01, dns02, and dns03, a pure seed of malware domain names can be obtained.

In FIG. 5, the computer called "minoas" can act as an open recursive DNS ((ORDNS), which can be a rDNS server willing to resolve a domain name for any host in the Internet—inside or outside its network) and as an authoritative DNS server for root DNS servers. By doing this, the minoas computer can provide NXs that appear to originate from the root DNS servers. This can force the malware to lookup the next domain name and not stop probing since the minoas computer does not allow the malware to contact the root servers. As indicated earlier, the malware needs to make contact with the C&C at least one time during a set period (e.g., daily). Thus, by providing NX answers to any domain name that the malware requests, the "minoas" computer can cause the malware to keep looking up all the generated domain names (e.g., 10,000) because no successful C&C connection will take place. In this way, all 10,000 domain names can be observed and can be used to train a statistical class that can identify malware based only on this traffic.

Referring again to FIG. 5, the "kritis" computer can be configured to give free Internet access to the dns01, dns02, and dns03 computers for one hour, and for the next eight hours to redirect the DNS traffic to the "minoas" computer. A simple IP table firewall "rotating rule" at the gateway point (e.g., at the "kritis" computer) can be used to do this.

The VMNET34 computer in FIG. 5 can be a virtual network connection between the virtual machines dns01, dns02, and dns03, and the virtual gateway "kritis".

Referring back to FIG. 2, in 210, training vectors can be created by taking each set of, for example, 10 domain names and computing various statistical values and putting the various statistical values in a vector. Example statistics are illustrated in FIG. 6, which is described in more detail below.

Those of ordinary skill in the art will see that training vectors can be created in many other ways, in addition to collecting NXs from honeypots, as described above.

Figure 3:
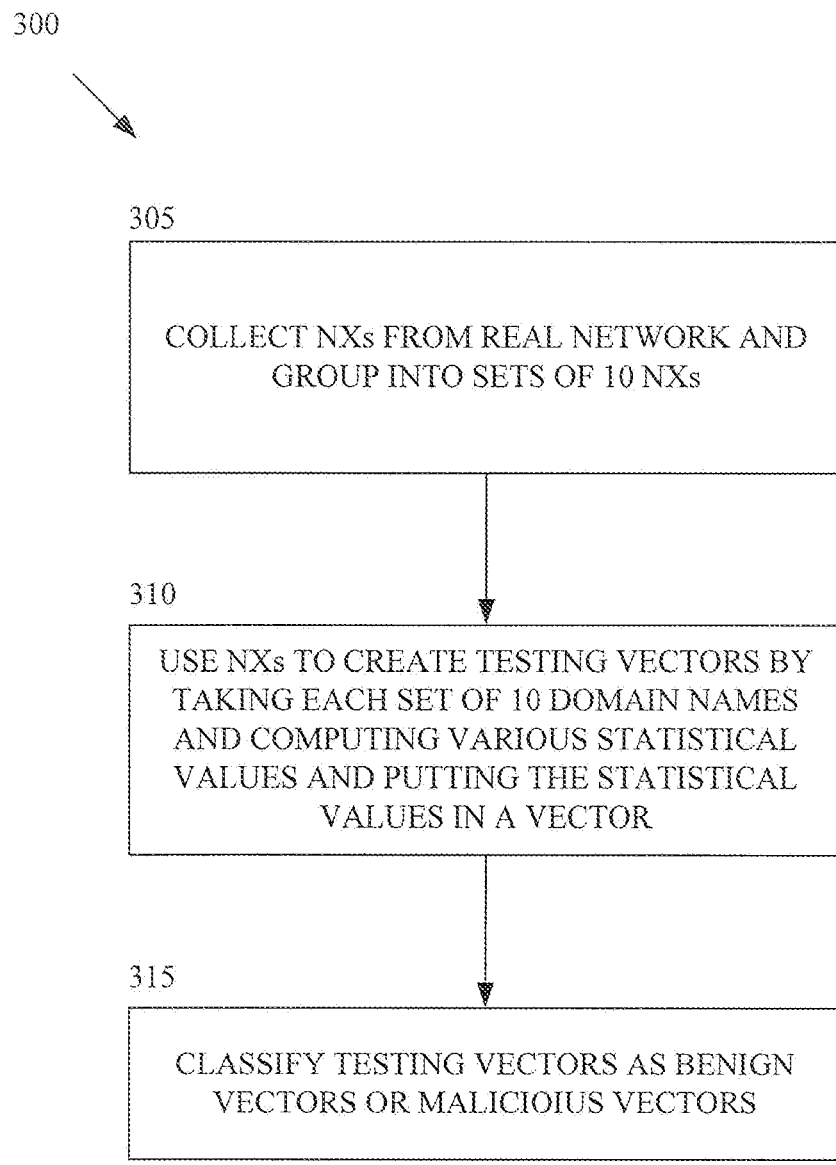
Figure 4:
Figure 8:
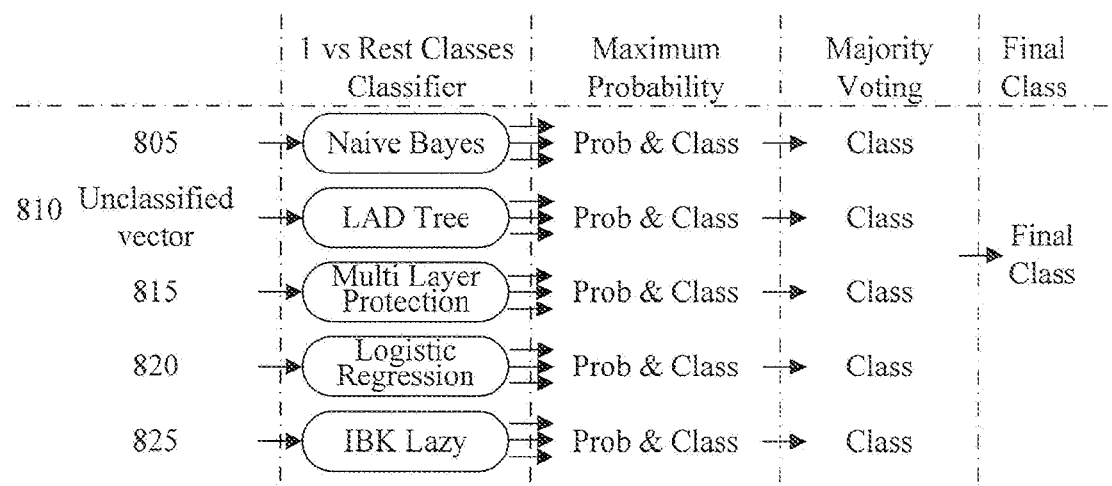

FIG. 3 illustrates a method for creating testing vectors, according to one embodiment. In 305, NXs are collected from a real network. In 310, the NXs from the real network can be used to create testing vectors by taking each set of, for example, 10 NX domain names and computing various statistical values and putting the various statistical values in a vector. (It should be noted that both the honeypot NXs and the real network NXs can be grouped in any number, and any algorithm can be used to group the sets.) It is not known if the testing NXs are malware or not. Thus, in 315, the testing vectors can be classified as benign vectors or malicious vectors by comparing testing vectors to training vectors. A classifier can use the knowledge obtained from the statistical information from the training vectors and compare it to the statistical information from the testing vectors to identify each different malware family in the testing NX vectors. FIG. 8 illustrates several types of classifiers that can be used to compare the vector information and identify different malware families. In particular, FIG. 8 illustrates the following classifiers: Naïve Bayes, LAD Tree, Multi-Layer Perception, Logistic Regression, and IBK Lazy. Those of ordinary skill in the art will see that many other types of classifiers can also be used. In addition, as explained in more detail below with respect to FIG. 8, a meta-classifier can use many different types of classifiers. In some embodiments, as also described in more detail below with respect to FIG. 8, a confidence score can also be given for each classifier, as well as for the meta-classifier.

For example, an absolute timing sequence, which can list the domain names in the order that they are received, can be used to group together an example set of ten NX domain names (e.g., from a real network):

--- fpemcjfbv.com
odkigktjzv.biz
odkigktjzv.biz.ebay.com
l-sjn-sevans.ca1.paypal.com
xvoal.com
ymtaiwwprpq.biz
ymtaiwwprpq.biz.ebay.com
bcbkdfkg.net
bcbkdfkg.net.ebay.com
okxixsulas.net

---

An example of various statistical values that can be computed for the set of NX domain names is illustrated in FIG. 6. Note that many other types of statistical values can be computed, and that the vector can have more or less statistical values than that called for in FIG. 6 (e.g., 17). Thus, for the example of 10 NX domain names provided above, the following statistical values can be computed. It should be noted that some or all of these statistical values can be computed. In addition, other statistical values can be computed and used.

The average of domain name length (not including ".") (e.g., the domain name length of the first domain name is 13). [Value≈12.8333]

The standard deviation of the domain name length. [Value≈1.9507]

The number of different Top Level Domains (TLDs). [Value≈3.0]

The length of the longest domain name (excluding the TLD). [Value 24.0]

The median of the frequency of each unique character across the entire set of domain names (e.g., the frequency of "o" across the entire set of 10 domain names above is 10). [Value≈2.0]

The average frequency of each unique character across the entire set of domain names. [Value≈2.2083]

The standard deviation of the frequency of each unique character across the entire set of domain names. [Value≈0.9565]

The median of the frequency of each unique 2-gram across the entire set of 10 domain names (e.g., the frequency of "fp" across the entire set of 10 domain names above is 1) (Note that if there is a "." (e.g., "v.c") between two characters, the frequency is counted as 0.) [Value≈0.9565]

The average of the frequency of each unique 2-gram across the entire set of 10 domain names. [Value≈1.0]

The standard deviation of the frequency of each unique 2-gram across the entire set of 10 domain names. [Value≈1.0]

The frequency of .com TLDs over the frequency of the other of TLDs. [Value≈1.5]

The median of the frequency of each unique 3-gram across the entire set of 10 domain names. [Value≈0.3333]

The average of the frequency of each unique 3-gram across the entire set of 10 domain names. [Value≈1.0]

The standard deviation of the frequency of each unique 3-gram across the entire set of 10 domain names. [Value≈1.0]

The median count of unique TLDs (excluding .com). [Value≈2.0]

The average count of unique TLDs (excluding .com). [Value≈2.0]

The standard deviation for the different frequencies for each different TLD in the set of domain names. [Value≈2.0]

The various statistical values for each set of 10 domain names from the real network NXs can be put in a vector. An example illustrating the domain names being transformed to statistical vectors, using the statistical values set forth in FIG. 6, is illustrated in FIG. 7. Referring to FIG. 7, in 705, the 10 domain names used to create the vector are listed. Note that all of these domain names can come from one particular asset 115 (e.g., an infected computer) in the real network 125:

--- fpemcjfbv.com
odkigktjzv.biz
odkigktjzv.biz.inter1.com
l-sjn-sevans.ca1.intern2.com
xvoal.com
ymtaiwwprpq.biz
ymtaiwwprpq.biz.inter1.com
bcbkdfkg.net
bcbkdfkg.net.inter1.com
okxixsulas.net

---

The 17 statistical values corresponding to the statistical values found in FIG. 6 are illustrated in the vector 710: [12.8333, 1.9507, 3.0, 24.0, 2.0, 2.2083, 0.9565, 0.9565, 1.0, 1.0, 1.5, 0.3333, 1.0, 1.0, 0.0, 2.0, 2.0, 2.0].

The NX application 105 can then utilize a meta-classifier to classify the testing vectors. The meta-classifier is a hybrid classifier and can comprise several generic classifiers. The various generic classifiers can be used (e.g., in parallel) to capture various different statistical properties which can potentially lower false positives (FP) and increase true positives (TP).

For example, FIG. 8 illustrates a meta-classifier that is comprised of five different classifiers: the Naïve Bayes classifier 805, the LAD Tree classifier 810, the Multi-Layer Perception Neural Network classifier 815, the Logistic Regression classifier 820, and the IBK Lazy Classifier 825. The maximum probability includes the classification (given by a particular classifier for the malware) and the probability of this classification being correct. Thus, for example, five different types of classifiers can be used to classify the malware as follows:

---
Classifier 1 (Naive Bayes Meta.) is: notknown (Confidence: 1)
Classifier 2 (Multi Layer Per. Meta.) is: conficker-B (Confidence: 0.985572986223)
Classifier 3 (Logistic Regression Meta.) is: conficker-B (Confidence: 0.374297598072)
Classifier 4 (LADtree Meta.) is: conficker-B (Confidence: 0.220571723953)
Classifier 5 (Lazy IB1 Meta.) is: conficker-B (Confidence: 1)
---

The majority voting can take the many classifications and determine which classification the majority of classifiers found. Thus, for the example above, conticker-B was the classification the majority of classifiers classified the malware as. The final class is the final classification based on the majority voting, which is conficker-B.

It should be noted that the meta-classifier can use any number and any type of known or unknown classifier, including, but not limited to, the above classifiers. The Naïve Bayes classifier can use estimator classes. Numeric estimator precision values can be chosen based on analysis of the training data. The LAD tree classifier can generate a multi-class alternating decision tree using a LogitBoost strategy. The Multi-Layer Perception Neural Network classifier can use backpropagation to classify instances. The Logistic Regression classifier can build linear logistic regression models. LogitBoost with simple regression can function as a base learner and can be used for fitting the logistic models. The IBK Lazy classifier can use normalized Euclidean distance to find the training instance closest to the given test instance, and can predict the same class as the training instance. If multiple instances have the same (smallest) distance to the test instance, the first one found can be used.

Additional information about all of the above classifiers can be found in Richard O. Duda et al., PATTERN CLASSIFICATION (2nd. Edition), which is herein incorporated by reference. Further information about the IBK Lazy classifier can be found in Niels Landwehr et al, LOGISTIC MODEL TREES (2005), which is also herein incorporated by reference.

For example, each classifier in the meta-classifier can classify vector 710 as follows:

---
Classifier 1 (Naive Bayes Meta.) is: notknown (Confidence: 1)
Classifier 2 (Multi Layer Per. Meta.) is: conficker-B (Confidence: 0.985572986223)
Classifier 3 (Logistic Regression Meta.) is: conficker-B (Confidence: 0.374297598072)
Classifier 4 (LADtree Meta.) is: conficker-B (Confidence: 0.220571723953)
Classifier 5 (Lazy IB1 Meta.) is: conficker-B (Confidence: 1)
---

Using the classification of the vector by each classifier, if a confidence threshold is set to be >=0.9 (note that this value can be set by the user), the meta-classifier can classify the vector (or statistical instance) as follows:

Instance 1 Meta classification detection result: conficker-B with majority voting value: 4 with confidence (med/std): (0.985572986223/0.345308923709). This means that a majority of four (out of five) of the classifiers found the vector to be classified as conficker-B. The median confidence score is the median of all five of the confidence scores, divided by the standard deviation of all five of the classifiers. It should be noted that, because the confidence threshold is set to be >=0.9, this number is only meaningful if the median confidence score is >=0.9.

FIG. 9 illustrates False Positive (FP) and True Positive (TP) classification results from the meta-classifier of FIG. 8 to one of six different malware classes: conficker-A, conficker-B, conficker-C, sinowal, bobax, and unknown: FIG. 9 indicates a FP value and a TP value for each type of malware. The FP rate is the False Positive detection rates for each different class. The TP rate is the True Positives detection rates for each different class. The FP rate can correspond to the percentage of vectors mistakenly classified as malicious which were actually benign. The TP rate corresponds to the percentage of vectors classified as malicious that were actually malicious. The following article, which is herein incorporated by reference, describes FP and TP rates in more detail: Axelsson. S., *The Base-Rate Fallacy and the Difficulty of Intrusion Detection*. ACM TRANS. INF. SYST. SECUR. 3, 3 (August 2000), 186-205.

It should be noted that the meta-classifier can be independent from the manner in which the NXs are collected. It is only necessary to keep a mapping between the internal asset that the NXs originated from. The detection flow is satisfied as long as the monitoring system in the real network collects NXs from the same internal asset and groups them into sets of 10 using the absolute timing sequence. This is because the classifier can be trained to detect such behavior. Thus, the trained classifier can utilize domain names collected in the same way in real time.

FIG. 9 also illustrates how domain names from known malware (e.g., sinowal, bobax, conficker) can be classified by the meta-classifier using information learned from the training set. Domain names that do not match the training set can be classified as "notknown" or "unknownBot". Hand verification or other methods can be used to classify the "notknown" domain names.

It should be noted that if many NXs are classified as "unknown", either a DNS issue causes such characterization, or the NXs are from malware where little or no information about the malware is known (e.g., a new worm). DNS issues can include a DNS outage or DNS misconfiguration. If a DNS issue is the cause of the high number of "unknown" classifications, the NXs can be classified as legitimate using for example, alexa.com, or a passive DNS feed. A passive DNS feed can be a technology which constructs zone replicas without cooperation from zone administrators, based on captured name server responses (see, e.g., F. Weimer, *Passive DNS Replications*, http://www.enyo.de/fw/software/dnslogger/2007, which is herein incorporated by reference). An example of a passive DNS feed is a DNSParse, which can be, for example, an implementation of the passive DNS technology by the University of Auckland in New Zealand (see, e.g., https://dnsparse.insee.auckland.ac.nz/dns/2007, which is herein incorporated by reference).

FIG. 10 illustrates an example of how to identify similar patterns in NXs and use those patterns to train a new class (e.g., an unknown-bot class). For example, reviewing the NXs of FIG. 10, a person or computer program could determine malware patterns such as, but not limited to: a size of 8 (after www) with a top level domain of .com.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method of analysis, comprising:
performing processing associated with collecting, using at least one processor circuit in communication with at least one database, at least one pre-defined number of NX domain names from at least one asset in at least one real network, the NX domain names being domain names that are not registered;
performing processing associated with utilizing, using the at least one processor circuit in communication with the at least one database, the statistical information about the at least one set of NX domain names to create testing vectors;
performing processing associated with classifying, using at least one processor circuit in communication with at least one database, the testing vectors as benign vectors or malicious vectors by comparing the statistical information in the testing vectors to statistical information in training vectors using at least one meta-classifier comprising at least two classifiers; and
performing processing associated with classifying, using at least one processor circuit in communication with at least one database, the at least one asset in the at least one real network as infected if the NX testing vector created from the real network NX domain names is classified as a malicious vector;
wherein the training vectors and the testing vectors are created by: computing the statistical information for at least one set of NX domain names; and collecting the statistical information for each set of NX domain names in at least one vector.

2. The method of claim 1, further comprising classifying previously unclassified malware from the NX domain names.

3. The method of claim 1, wherein only DNS NX domain name information is utilized to classify the at least one asset as infected.

4. The method of claim 1, wherein only NX domain traffic is utilized.

5. The method of claim 1, wherein the meta-classifier provides intelligence for identifying new malware.

6. The method of claim 1, further comprising classifying previously classified malware from the NX domain names.

7. The method of claim 1, wherein the NX domain names collected from the at least one honeypot and the at least one real network are grouped into sets of 10 using absolute timing sequence information.

8. The method of claim 1, wherein the statistical information comprises: an average of domain name length; a standard deviation of a domain name length; a number of different top level domains; a length of a domain name excluding a top level domain; a median of a number of unique characters; an average of a number of unique characters; a standard deviation of a number of unique characters; a median of unique 2-grams; an average of unique 2-grams; a standard deviation of unique 2-grams; a frequency of ,com top level domains over frequency of remaining to level domains; a median of unique 3-grams; an average of unique 3-grams; a standard deviation of unique 3-grams; a median count of unique top level domains; an average count of unique top level domains; or a standard deviation count of to level domains; or any combination thereof.

9. The method of claim 1, wherein NX domain names from honeypots are used to create the training vectors.

10. A system of analysis, comprising:
at least one processor circuit in communication with at least one database, the at least one processor circuit connected to at least one network and configured for;
performing processing associated with collecting at least one pre-defined number of NX domain names from at least one asset comprising at least one processor in at least one real network, the NX domain names being domain names that are not registered;
performing processing associated with using statistical information about the pre-defined number of -NX domain names to create testing vectors;
performing processing associated with classifying the testing vectors as benign vectors or malicious vectors by comparing the statistical information in the testing vectors to statistical information in training vectors using at least one meta-classifier comprising at least two classifiers; and
performing processing associated with classifying the at least one asset in the at least one real network as infected if the NX testing vector created from the real network NX domain names is classified as a malicious vector;
wherein the training vectors and the testing vectors are created by: computing the statistical information for at least one set of NX domain names; and collecting the statistical information for each set of NX domain names in at least one vector.

11. The system of claim 10, wherein the at least one application is further configured for classifying previously unclassified malware from the NX domain names.

12. The system of claim 10, wherein only DNS NX domain name information is utilized to classify the at least one asset as infected.

13. The system of claim 10, wherein only NX domain traffic is utilized.

14. The system of claim 10, wherein the meta-classifier provides intelligence for identifying new malware.

15. The system of claim 10, wherein the at least one application is further configured for classifying previously classified malware from the NX domain names.

16. The system of claim 10, wherein the NX domain names collected from the at least one honeypot and the at least one real network are grouped into sets of 10 using absolute timing sequence information.

17. The system of claim 10, wherein the statistical information comprises: an average of domain name length; a standard deviation of a domain name length; a number of different top level domains; a length of a domain name excluding a top level domain; a median of a number of unique characters; an average of a number of unique characters; a standard deviation of a number of unique characters; a median of unique 2-grams; an average of unique 2-grams; a standard deviation of unique 2-grams; a frequency of .com top level domains over frequency of remaining to level domains; a median of unique 3-grams; an average of unique 3-grams; a standard deviation of unique 3-grams; a median count of unique top level domains; an average count of unique top level domains; or a standard deviation count of to level domains; or any combination thereof.

18. The system of claim 10, wherein NX domain names from honeypots are used to create the training vectors.

* * * * *